(12) United States Patent
Yamamoto et al.

(10) Patent No.: US 7,080,721 B2
(45) Date of Patent: Jul. 25, 2006

(54) ONEWAY CLUTCH AND MOUNTING STRUCTURE THEREOF

(75) Inventors: Norihiro Yamamoto, Fukuroi (JP); Hiroyuki Ohishi, Hamamatsu (JP)

(73) Assignee: NSK-Warner K.K., Tokyo (JP)

( * ) Notice: Subject to any disclaimer, the term of this patent is extended or adjusted under 35 U.S.C. 154(b) by 72 days.

(21) Appl. No.: 10/872,493

(22) Filed: Jun. 22, 2004

(65) Prior Publication Data
US 2004/0256189 A1  Dec. 23, 2004

(30) Foreign Application Priority Data
Jun. 23, 2003   (JP)   ............... 2003-178356

(51) Int. Cl.
*F16D 41/067*   (2006.01)
(52) U.S. Cl. ............... 192/45; 192/110 B; 192/113.32; 192/115; 188/82.84
(58) Field of Classification Search ............. 188/82.84; 192/113.32, 115
See application file for complete search history.

(56) References Cited

U.S. PATENT DOCUMENTS

| | | | | |
|---|---|---|---|---|
| 3,623,581 A | * | 11/1971 | Livezey | 192/45 |
| 3,732,956 A | * | 5/1973 | Johnson et al. | 192/45 |
| 5,634,540 A | * | 6/1997 | Awaji et al. | 192/41 R |
| 5,928,104 A | * | 7/1999 | Kimura et al. | 475/318 |
| 6,044,945 A | * | 4/2000 | Muramatsu | 192/45 |
| 6,079,534 A | * | 6/2000 | Ando | 192/45.1 |
| 2002/0011385 A1 | * | 1/2002 | Hayabuchi et al. | 188/82.1 |

FOREIGN PATENT DOCUMENTS

JP   2002-39222   2/2002

* cited by examiner

*Primary Examiner*—Richard M. Lorence
(74) *Attorney, Agent, or Firm*—Miles & Stockbridge PC

(57) ABSTRACT

A oneway clutch supporting structure comprises a oneway clutch which comprises a stationary race element and a rotational race element to be fitted in a rotational member, the race elements respectively having peripheral surfaces separated from each other in the radial direction to face each other, a plurality of bearings for coaxially retaining the race elements and disposed inside an annular space between the stationary race element and the rotational race element with separated from each other at a predetermined angle, torque transmission members disposed between the peripheral surfaces of the stationary race element and the rotational race element, and a stationary member for supporting the stationary race element. A clearance between the stationary member and the stationary race element is smaller than a clearance between the rotational member and the rotational race element.

16 Claims, 3 Drawing Sheets

A-A' SECTION     B-B' SECTION

ONEWAY CLUTCH AND MOUNTING STRUCTURE THEREOF

This application claims the benefit of Japanese Patent application No. 2003-178356 which is hereby incorporated by reference.

BACKGROUND OF THE INVENTION

1. Field of the Invention

The present invention relates to a one-way clutch used in an automatic transmission, or the like, and a mounting structure of the oneway clutch.

2. Related Background Art

For instance, in a oneway clutch disclosed in the Japanese Patent Application Laid-Open No. 2002-39222, a large number of lock members such as sprags or rollers are provided between an outer race and an inner race to be supported by a retainer, and end bearings are disposed on the both sides thereof in the axial direction.

The oneway clutch is used in various uses as a mechanical element. Particularly, when the one-way clutch is used in an automatic transmission as means for latching a rotational element of a planetary gear for constituting a gear change mechanism on to a transmission case, a latched state of the rotational element on to the transmission case can be automatically released by a reverse rotation of a torque which is applied on the rotational element, dissimilarly from a frictional engagement element of a multiple disc wet structure. As a result, the oneway clutch is effectively used as latching means which brings one of different rotational elements into engagement and, at the same time, releases the engagement when a speed changing operation is performed for releasing the other of the rotational elements.

There is conventionally disclosed a technology for assembling and supporting such a oneway clutch in a transmission in the Japanese Patent Application Laid-Open No. 2002-39222. In this Japanese Patent Application Laid-Open No. 2002-39222, it is arranged such that a play of a fitting portion on either an outer race or an inner race, whichever is connected to a case, is reduced (that is, a large movement in the radial direction of the outer race which always stands still is restricted by reducing a play with the case) and a large load in the radial direction is not applied on an end bearing. As a result, the surface pressure to be applied on the end bearing can be reduced and the durability of the oneway clutch can be improved. Also, since a radial movement of a rotational member which is fitted with the inner race is absorbed by the play of the fitting portion with the inner race, the force of inertia acting in the radial direction on the rotational member does not act on the inner race, so that the surface pressure acting on the end bearing can be reduced and the durability of the oneway clutch is improved.

Also, in the Japanese Patent Application Laid-Open No. 2002-39222, it is possible to further reduce the surface pressure applied on the end bearing by substantially eliminating the play in the fitting portion between the outer race and the case since the load in the radial direction applied on the outer race but also the dead load thereof is supported on the case through a contact portion of a spline. Moreover, since the end bearing is arranged to be located on the inner peripheral side than the outer race so as to support only the inner race having a smaller mass, the surface pressure acting on the end bearing can be further reduced.

As described above, the Japanese Patent Application Laid-Open No. 2002-39222 discloses a structure for mounting the oneway clutch by the use of an end bearing.

However, there are some oneway clutches which have no end bearing, but in which the dead load is applied onto a rotational member. Furthermore, an outer race member or an inner race member onto which such a load is applied may be abraded.

Also, to obtain the structure disclosed in the Japanese Patent Application Laid-Open No. 2002-39222, it is necessary to machine the teeth of the spline with certain precision. To machine the tooth bottom portions of the spline is not easy because a working tool is required to be put to each of the tooth bottom portions, which requires a considerable processing time. Accordingly, for a oneway clutch with this structure, it is inevitably required to form these tooth bottom portions requiring high precision on either one of a stationary member and the outer race member.

In view of the above circumferences, it is an object of the present invention to reduce a load to be applied onto an outer race member or an inner race member which is mounted on a rotational member so as to prevent abrasion of whichever member suffering this load. It is another object of the present invention to provide a oneway clutch and a mounting structure of the oneway clutch in which a stationary member and a support reference surface of the outer race member or the inner race member to be mounted on the stationary member can be processed or machined easily.

In order to solve the above problems, according to the present invention, there is proposed a mounting structure of a oneway clutch comprising an outer race member and an inner race member either of which is mounted on a stationary member and the other of which is mounted on a rotational member, wherein a bearing means other than an end bearing is interposed between said outer race member and said inner race member; and a clearance between said stationary member and said one member is smaller than a clearance between said rotational member and said other member.

Also, in the mounting structure of a one-way clutch of the present invention, it is preferable that said one member is restricted and supported in the radial direction by said stationary member.

Also, in the mounting structure of a one-way clutch of the present invention, it is preferable that said one member which is mounted on said stationary member is provided with an arcuate support reference surface which is drawn around the center of said member, and a radial positioning is performed by restricting and supporting said support reference surface.

Also, in the mounting structure of a one-way clutch of the present invention, it is preferable that cam surfaces are formed on said one member and a cylindrical surface is formed on the other member.

Also, in the mounting structure of a one-way clutch of the present invention, it is preferable that said one member is the outer race member and the other member is the inner race member.

Also, in the mounting structure of a one-way clutch of the present invention, it is preferable that said one member is supported in the axial direction by said stationary member with a stop ring.

Also, in the mounting structure of a one-way clutch of the present invention, it is preferable that said one member is provided with an engagement projection to be fitted in said stationary member.

Also, in the mounting structure of a one-way clutch of the present invention, it is preferable that at least one of said outer race member and said inner race member is provided with an oil path for supplying a lubricating oil to said cam surfaces or said cylindrical surface.

Also, according to a second aspect of the invention, there is provided a oneway clutch in which either one of an outer race member and an inner race member is mounted on a stationary member and the other is mounted on a rotational member, wherein:

said one member mounted on the stationary member is provided with an arcuate support reference surface around the center of said one member.

In the oneway clutch of the second aspect of the invention, it is preferable that said support reference surface is circular.

In the oneway clutch of the second aspect of the invention, it is preferable that said one member is provided with an engagement projection which is fitted in said stationary member.

In the oneway clutch of the second aspect of the invention, it is preferable that said support reference surface and said engagement projection are disposed at different positions, respectively, seen in the axial direction.

In the oneway clutch of the second aspect of the invention, it is preferable that said one member is provided with cam surfaces and the other member is provided with a cylindrical surface.

In the oneway clutch of the second aspect of the invention, it is preferable that said one member is the outer race member and the other member is the inner race member.

In the oneway clutch of the second aspect of the invention, it is preferable that between said outer race member and said inner race member there are provided rollers serving as torque transmission members and a retainer for retaining said rollers and means for biasing said rollers in the direction of engagement.

In the oneway clutch of the second aspect of the invention, it is preferable that a block bearing is provided between said outer race member and said inner race member.

In the oneway clutch of the second aspect of the invention, it is preferable that at least one of said outer race member and said inner race member is provided with an oil path for supplying a lubricating oil to said cam surfaces or said cylindrical surface.

DETAILED DESCRIPTION OF THE PREFERRED EMBODIMENTS

The present invention will be specifically described in the following with reference to the drawings.

Figure 1:
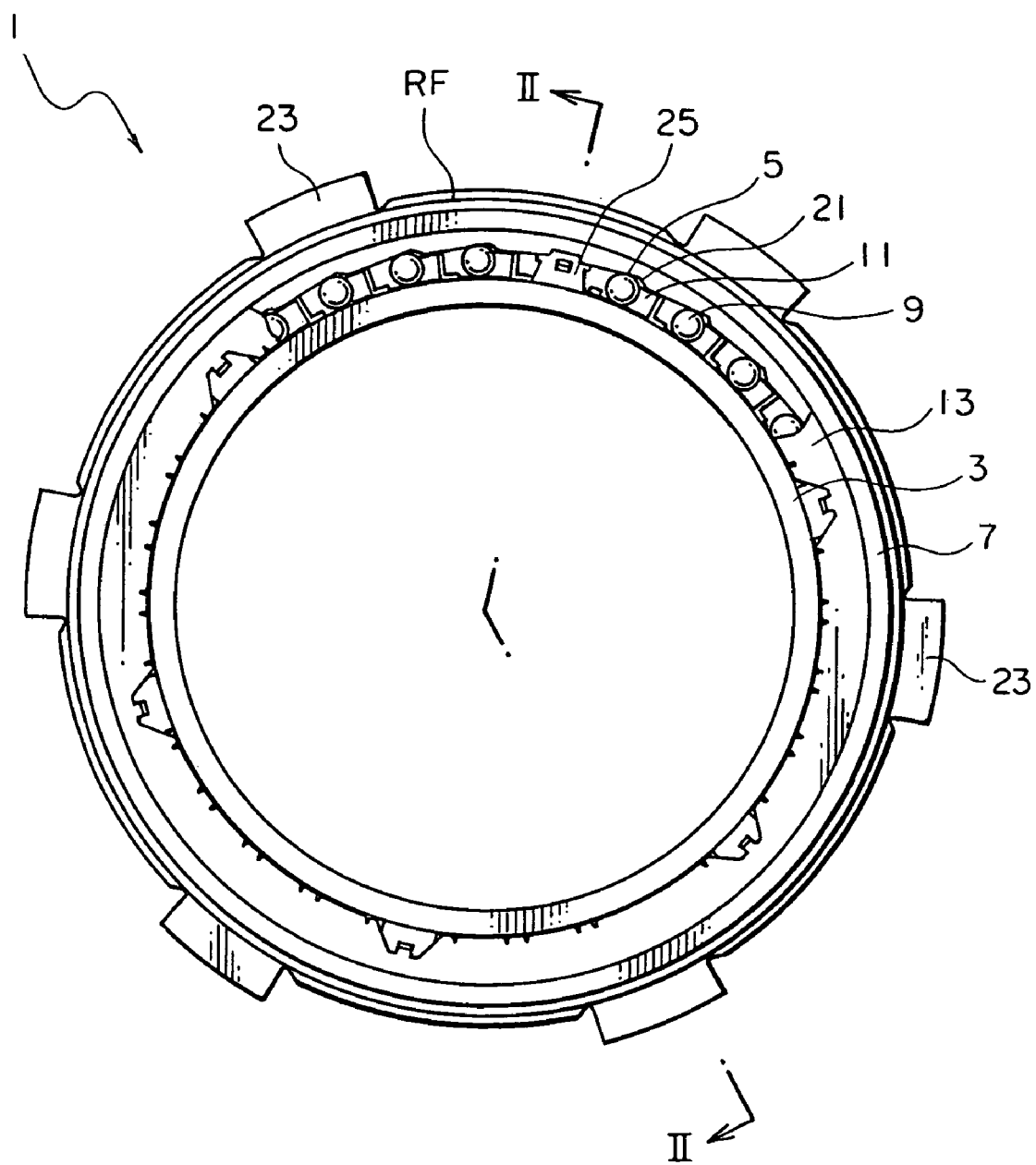
FIG. 1 is a front view for showing an embodiment of a oneway clutch apparatus according to the present invention.
Figure 2:
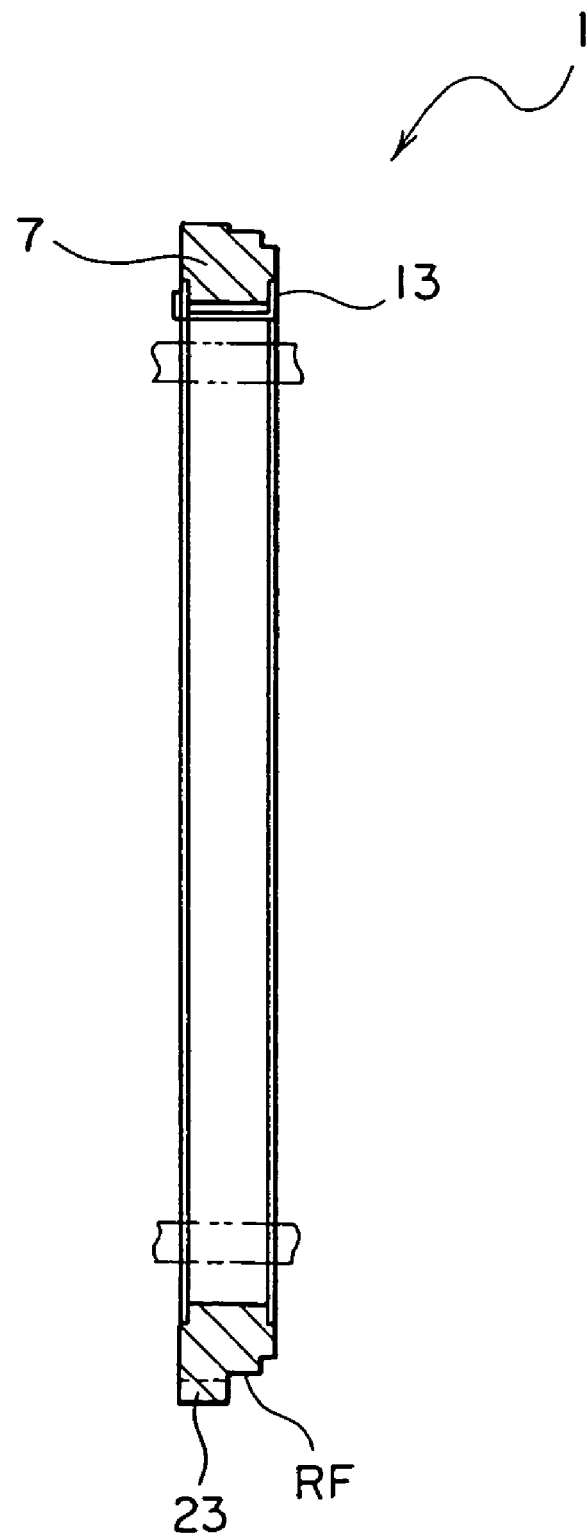
FIG. 2 is a cross-sectional view taken along the line II—II in FIG. 1.
Figure 3:
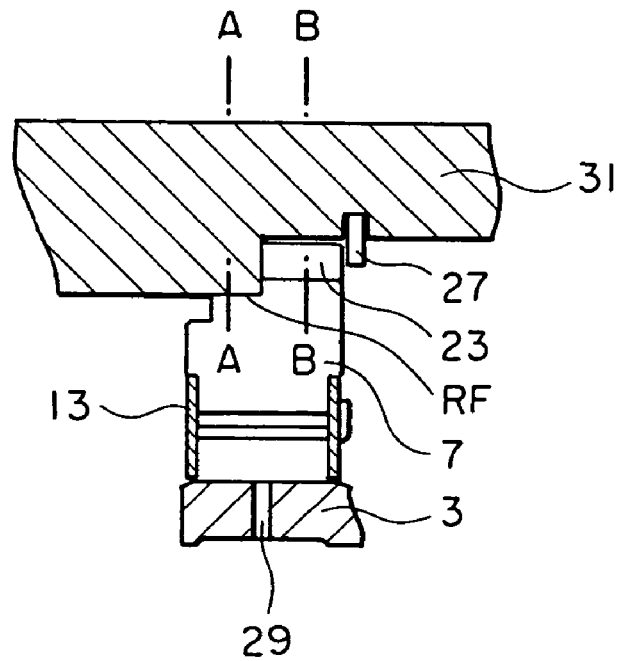
FIG. 3 is a cross-sectional view for showing a mounting structure of the oneway clutch in the axial direction.
Figure 4:
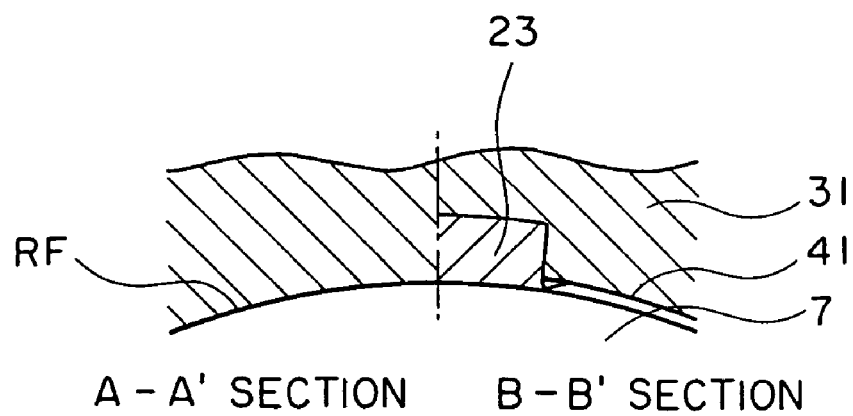
FIG. 4 is a view for showing a cross-section taken along the line A—A and a cross-section taken along the line B—B in FIG. 3.

FIG. 1 is a front view for showing an embodiment of a oneway clutch apparatus according to the present invention, FIG. 2 is a cross-sectional view of an outer race member 7 taken along the line II—II in FIG. 1, FIG. 3 is a cross-sectional view for showing a mounting structure of the oneway clutch in the axial direction, and FIG. 4 is a view for showing a cross-section taken along the line A—A and a cross-section taken along the line B—B in FIG. 3.

As shown in FIG. 1 and FIG. 2, the one-way clutch apparatus 1 of the present embodiment is comprised of an inner race member 3, the outer race member 7 which is disposed coaxially and relatively rotatable with respect to the inner race member 3 and is provided with a plurality of cam surfaces 5 formed on the inner periphery thereof, a plurality of torque transmission rollers 9 interposed between the inner race member 3 and the outer race member 7, accordion springs 11 for urging the respective torque transmission rollers 9 in the direction of torque transmission, and a retainer 13 formed of a steel plate. The cam surfaces 5 and non-wedge effect acting surfaces 21 are formed in the inner peripheral section of the outer race member 7. The outer peripheral section of the inner race member 3 is formed as a cylindrical surface. With this structure, when the inner race member 3 is rotated toward the non-wedge effect acting surfaces 21, the torque transmission rollers 9 allow the rotation of the inner race member 3. On the other hand, when the inner race member 3 is rotated toward the cam surfaces 5, the torque transmission rollers 9 are latched on the cam surfaces 5 to prevent the rotation of the inner race member 3 in cooperation with the outer race member 7 in a stationary state.

The outer race member 7 is provided with a plurality of engagement projections or claws 23 to be fitted in a stationary member 31 such as a case of a transmission. Note that a support reference surface RF to be described later and the engagement projection (claw) 23 are respectively formed on the outer periphery of the outer race member 7 at different positions seen in the axial direction. Further, as shown in FIG. 1, block bearings 25 are provided between the outer race member 7 and the inner race member 3. A clearance between the outer race member 7 and the inner race member 3 is kept by these block bearings 25.

In case of the present embodiment, the block bearings 25 which are not end bearings are interposed between the outer race member 7 and the inner race member 3 to keep the outer race member and the inner race member coaxially.

The inner race member 3 is fitted fixedly on a rotational member such as a rotational shaft (not shown) provided in the transmission.

In the present embodiment, a clearance between the stationary member 31 transmission case and the outer race member 7 is set to be smaller than a clearance between the rotational member (not shown) and the inner race member 3 fitted thereon. That is, the outer race member 7 is restricted and supported on the stationary member 31 in the radial direction. More specifically, the outer race member 7 mounted on the stationary member 31 is provided with an arcuate support reference surface RF which is drawn around the center of the outer race member 7, and it is arranged to perform positioning of the outer race member 7 in the radial direction by restricting and supporting the outer race member on the stationary member 31 with this support reference surface RF, that is, by supporting the outer race member so as to prevent it from moving in the radial direction.

That is, as shown in FIG. 3, the annular support reference surface RF is formed on one side on the outer peripheral surface of the outer race member 7, and this support reference surface RF is tightly fitted in the stationary member 31.

As a result, the clearance between the stationary member 31 and the outer race member 7 is smaller than the clearance between the rotational member (not shown) and the inner race member 3, and the dead load of the oneway clutch is not applied on the rotational member, so that abrasion of the rotational member and the like can be suppressed.

As described above, the outer race member 7 is provided with the support reference surface RF, and the support reference surface RF and the engagement projections (claws) 23 are disposed on the outer periphery of the outer race member 7 at different positions, seen in the axial direction. For this reason, it is enough for the support reference surface RF if it is machined to be circular or annular, and there is no need to machine it further using tools such as a cutting tool. As a result, the processing operation can be performed easily for a short time, and moreover the productivity can be improved.

Also, as shown in FIG. 4, the clearance between the stationary member 31 and the outer race member 7 can be small on the support reference surface RF, and can be larger in a part at which the engagement projection or claw 23 is fitted therein. As a result, there is no need to finish an arcuate portion 41 between the engagement projection 23 and the engagement projection 23 with high precision.

Note that the description "the arcuate support reference surface RF drawn around the center of the one member" in this specification and the claims therein means that the support reference surface RF may be not continuous but a slit or a hole, or the like, if any, may be formed thereon.

As shown in FIG. 3, the outer race member 7 is axially supported with a stop ring 27 on the stationary member 31. The inner race member 3 is provided with an oil path 29 for supplying a lubricating oil to the cam surfaces 5 or the cylindrical surface.

The cam surfaces 5 are formed on the inner peripheral side of the outer race member 7 and a cylindrical surface is formed on the outer peripheral side of the inner race member 3. Then, since the rollers, the retainer, and the like, are secured to whichever member with the cam surfaces 5 formed thereon, if the other member with the cylindrical surface formed thereon is mounted on the rotational member, the inertial moment is not generated, thereby achieving higher efficiency.

Since the outer race member 7 is axially supported with the stop ring 27 on the stationary member 31, it is possible to simplify the mounting structure thereof.

Since the outer race member 7 is provided with the engagement projection to be fitted in the stationary member 31, accompanying movement in the circumferential direction can be prevented.

Since the inner race member 3 is provided with the oil path 29 for supplying a lubricating oil to the cam surfaces 5 or the cylindrical surface, seizure can be prevented.

Though the specific description of the embodiment of the present invention is as above, the present invention is not limited to this embodiment.

For instance, in the foregoing embodiment, the present invention is applied to the oneway clutch apparatus of the roller type having cam surfaces on the outer race member. However, the present invention may be applied to a oneway clutch having the cam surfaces on the inner race member or having steel balls as the torque transmission members, instead of the torque transmission rollers.

In the present embodiment, since the clearance between the stationary member and the outer race member is smaller than the clearance between the rotational member and the inner race member, the dead load of the oneway clutch having no end bearing is not applied on the rotational member, or the like (the rotational member itself or the outer or inner race mounted on the rotational member). As a result, abrasion of the rotational member, or the like, can be suppressed.

In the present embodiment, the support reference surface is provided on the outer race member, and the support reference surface and the engagement projections (claws) are disposed at different positions in the axial direction. For this reason, it is sufficient for the support reference surface if it is processed to be circular (annular) and there is no need to effect further machining by putting tools such as a cutting tool thereto again, so that the process can be easier for a shorter time. With this structure, it is possible to facilitate the processing and to conspicuously improve the productivity.

In the present embodiment, the cam surfaces are formed on the one of the members while the cylindrical surface is formed on the other. Then, since the rollers, the retainer, and the like, are secured to the member with the cam surfaces formed thereon, if the member with the cylindrical surface formed thereon is mounted on the rotational member, the inertial moment is not applied on this member, which results in higher efficiency.

In the present embodiment, since the outer race member is supported in the axial direction with the stop ring on the stationary member, the mounting structure thereof can be simplified.

In the present embodiment, since the outer race member is provided with engagement projections to be fitted to the stationary member, the accompanying movement in the circumferential direction can be prevented.

In the present embodiment, since at least one of the outer race member and the inner race member is provided with the oil path for supplying a lubricating oil to the cam surfaces or the cylindrical surface, seizure can be prevented.

The invention claimed is:

1. A oneway clutch comprising: a stationary race element supported by a stationary member and a rotational race element supported by a rotational member respectively having peripheral surfaces separated from each other in a radial direction to face each other; a plurality of bearings disposed inside an annular space between said stationary race element and said rotational race element to be separated from each other at a predetermined angle for coaxially retaining said race elements; and torque transmission members disposed between the peripheral surfaces of said stationary race element and said rotational race element, wherein said stationary race element is provided with a circular support reference surface around a center of said stationary race element and said stationary race element is supported on said stationary member with said circular support reference surface.

2. A oneway clutch according to claim 1, wherein said stationary race element is provided with an engagement projection to be fitted in said stationary member.

3. A oneway clutch according to claim 1, wherein surfaces are formed at predetermined intervals on the peripheral surface of said stationary race element and the peripheral surface of said rotational race element is formed to be cylindrical.

4. A oneway clutch according to claim 3, wherein said stationary race element is an outer race member while said rotational race element is an inner race member.

5. A oneway clutch according to claim 4, wherein:
said torque transmission members are rollers; and
a retainer is further provided for retaining said rollers and means for biasing said rollers in a direction of engagement.

6. A oneway clutch according to claim 5, wherein said bearings are block bearings.

7. A oneway clutch according to claim 6, wherein at least one of said outer race member and said inner race member is provided with an oil path for supplying a lubricating oil to said cam surfaces and said cylindrical surface.

8. A oneway clutch comprising: a stationary race element supported by a stationary member and a rotational race element supported by a rotational member respectively having peripheral surfaces separated from each other in a radial direction to face each other; a plurality of bearings disposed inside an annular space between said stationary race element and said rotational race element to be separated from each other at a predetermined angle coaxially retaining said race elements; and torque transmission members disposed between the peripheral surfaces of said stationary race element and said rotational race element, wherein said stationary race element is provided with an arcuate support reference surface around a center of said stationary race element and said stationary race element is supported on said stationary member with said support reference surface;

wherein said stationary race element is provided with an engagement projection to be fitted in said stationary member and wherein said support reference surface and said engagement projection are respectively disposed at different positions in an axial direction.

9. A oneway clutch according to claim 8, wherein said support reference surface is circular.

10. A oneway clutch according to claim 8, wherein cam surfaces are formed at predetermined intervals on the peripheral surface of said stationary race element and the peripheral surface of said rotational race element is formed to be cylindrical.

11. A oneway clutch according to claim 10, wherein said stationary race element is an outer race member while said rotational race element is an inner race member.

12. A oneway clutch according to claim 11, wherein:
said torque transmission members are rollers; and
a retainer is further provided for retaining said rollers and means for biasing said rollers in a direction of engagement.

13. A oneway clutch according to claim 12, wherein said bearings are block bearings.

14. A oneway clutch according to claim 13, wherein at least one of said outer race member and said inner race member is provided with an oil path for supplying a lubricating oil to said cam surfaces and said cylindrical surface.

15. A oneway clutch comprising:
an outer race element and an inner race element rotatable relative to each other in a predetermined direction;
torque transmission members disposed between radially opposed peripheral surfaces of said outer race element and said inner race element; and
a support member supporting said outer race element,
wherein said outer race element is provided with a circular support reference surface around a center of said outer race element, said support member has a support portion disposed radially outwardly of said circular support reference surface, and said outer race element is supported on said portion of said support member with said circular support reference surface.

16. A oneway clutch comprising:
an outer race element and an inner race element rotatable relative to each other in a predetermined direction;
torque transmission members disposed between radially opposed peripheral surfaces of said outer race element and said inner race element; and
a support member for supporting said outer race element,
wherein said outer race element is provided with an arcuate support reference surface around a center of said outer race element,
said support member has a support portion disposed radially outwardly of said arcuate support reference surface,
said outer race element is supported on said portion of said support member with said arcuate support reference surface,
said outer race element is provided with an engagement projection to be fitted in said support member, and
said arcuate support reference surface and said engagement projection are respectively disposed at different positions in an axial direction.

* * * * *